United States Patent
Ito et al.

(10) Patent No.: US 10,899,890 B2
(45) Date of Patent: Jan. 26, 2021

(54) AROMATIC POLYSULFONE AND AROMATIC POLYSULFONE COMPOSITION

(71) Applicant: Sumitomo Chemical Company, Limited, Tokyo (JP)

(72) Inventors: Kazuyuki Ito, Tsukuba (JP); Yoshio Shoda, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/311,239

(22) PCT Filed: Jun. 21, 2017

(86) PCT No.: PCT/JP2017/022812
§ 371 (c)(1),
(2) Date: Dec. 19, 2018

(87) PCT Pub. No.: WO2017/221966
PCT Pub. Date: Dec. 28, 2017

(65) Prior Publication Data
US 2019/0185626 A1   Jun. 20, 2019

(30) Foreign Application Priority Data
Jun. 24, 2016   (JP) .................................. 2016-125964

(51) Int. Cl.
| C08G 75/23 | (2006.01) |
| C08L 71/10 | (2006.01) |
| C08G 65/40 | (2006.01) |
| C08G 75/20 | (2016.01) |
| G01N 30/26 | (2006.01) |
| C08L 81/06 | (2006.01) |
| G01N 30/74 | (2006.01) |
| C08G 65/46 | (2006.01) |
| G01N 30/88 | (2006.01) |
| C09J 181/06 | (2006.01) |

(52) U.S. Cl.
CPC ............ *C08G 75/23* (2013.01); *C08G 65/40* (2013.01); *C08G 65/46* (2013.01); *C08G 75/20* (2013.01); *C08L 71/10* (2013.01); *C08L 81/06* (2013.01); *C09J 181/06* (2013.01); *G01N 30/26* (2013.01); *G01N 30/74* (2013.01); *G01N 30/88* (2013.01)

(58) Field of Classification Search
None
See application file for complete search history.

(56) References Cited

U.S. PATENT DOCUMENTS

| 4,321,174 A | 3/1982 | Hoy et al. |
| 5,086,157 A | 2/1992 | Reuter et al. |
| 2003/0224222 A1 | 12/2003 | Matsuoka et al. |
| 2011/0224386 A1* | 9/2011 | Weber .................... C08G 65/48 525/523 |
| 2016/0002431 A1 | 1/2016 | Bajjuri et al. |
| 2016/0017193 A1 | 1/2016 | Tanaka et al. |
| 2016/0075850 A1 | 3/2016 | Weber et al. |

FOREIGN PATENT DOCUMENTS

| CA | 2045291 A1 | 12/1991 |
| EP | 0016544 A2 | 10/1980 |
| EP | 0194062 A2 | 9/1986 |
| EP | 0467826 A2 | 1/1992 |
| EP | 2189487 A1 | 5/2010 |
| JP | 55-129448 A | 10/1980 |
| JP | 56-104963 A | 8/1981 |
| JP | 59-226082 A | 12/1984 |
| JP | 02-029431 A | 1/1990 |
| JP | 05-500379 A | 1/1993 |
| JP | 05-214291 A | 8/1993 |
| JP | 3312470 B2 | 8/2002 |
| JP | 2003-012795 A | 1/2003 |
| JP | 2003-292609 A | 10/2003 |
| JP | 2004-238585 A | 8/2004 |
| JP | 2006077193 A | 3/2006 |
| JP | 2006-291046 A | 10/2006 |
| JP | 4174338 B2 | 10/2008 |
| JP | 2012-509375 A | 4/2012 |

(Continued)

OTHER PUBLICATIONS

Extended European Search Report dated Nov. 20, 2019 in EP Application No. 17815434.0.
Int'l Search Report dated Sep. 19, 2017 in Int'l Application No. PCT/JP2017/022812.
Office Action dated May 11, 2020 in CN Application No. 201780037915.1 (with English Machine Translation).
Office Action dated Feb. 18, 2020 in JP Application No. 2016125964 (Machine English Translation).

(Continued)

*Primary Examiner* — Robert T Butcher

(74) *Attorney, Agent, or Firm* — Panitch Schwarze Belisario & Nadel LLP

(57) ABSTRACT

The invention provides an aromatic polysulfone including an aromatic polysulfone having at least one highly polar functional group at its terminus, wherein in the aromatic polysulfone, an area of a signal attributed to the aromatic polysulfone having a highly polar functional group with respect to a total area of all signals attributed to the aromatic polysulfone in a chromatogram obtained by measurement through a gel permeation chromatography method under the following conditions is 19% or more and 100% or less, wherein sample injection volume is 5 μL, column is "Shodex KF-803" manufactured by Showa Denko K.K., column temperature is 40° C., eluent is N,N-dimethylformamide, eluent flow rate is 0.5 mL/min, and detector is ultraviolet-visible spectrophotometer (UV).

6 Claims, 2 Drawing Sheets

(56) References Cited

FOREIGN PATENT DOCUMENTS

| | | |
|---|---|---|
| JP | 2014-169419 A | 9/2014 |
| WO | 91/00876 A1 | 1/1991 |
| WO | 2013015366 A1 | 1/2013 |
| WO | 2014177643 A1 | 11/2014 |

OTHER PUBLICATIONS

Office Action dated Sep. 17, 2020 in EP Application No. 17815434.0.
Office Action dated Sep. 20, 2020 in IN Application No. 201847048265.

* cited by examiner

AROMATIC POLYSULFONE AND AROMATIC POLYSULFONE COMPOSITION

CROSS-REFERENCE TO RELATED APPLICATION

This application is a Section 371 of International Application No. PCT/JP2017/022812, filed Jun. 21, 2017, which was published in the Japanese language on Dec. 28, 2017 under International Publication No. WO 2017/221966 A1, and claims priority under 35 U.S.C. § 119(b) to Japanese Application No. 2016-125964 filed Jun. 24, 2016, the disclosures of which are incorporated herein by reference in their entirety.

TECHNICAL FIELD

The present invention relates to an aromatic polysulfone and an aromatic polysulfone composition.

Priority is claimed on Japanese Patent Application No. 2016425964, filed Jun. 24, 2016, the content of which is incorporated herein by reference.

BACKGROUND ART

Since aromatic polysulfones are one type of amorphous thermoplastic resins and are excellent in heat resistance mechanical properties and transparency, they are used for various applications, such as parts of electronic devices, as forming materials of molded articles and films. An aromatic polysulfone is usually produced by subjecting an aromatic dihalogenosulfone compound and an aromatic dihydroxy compound to a polycondensation reaction in the presence of a base and a reaction solvent (see, for example, Patent Document 1).

In recent years, with the miniaturization and thinning of members using aromatic polysulfones, aromatic polysulfones that exhibit high adhesive properties even in a small area have been required. In addition, there are an increasing number of members having a curved surface portion as a configuration with enhanced designability, and aromatic polysulfones that exhibit high adhesive properties also on a curved surface portion have been required. For adhesion of members using an aromatic polysulfone as a forming: material, for example, a pressure-sensitive adhesive sheet is used since it can be adhered with a force of about the degree of finger pressure at ordinary temperature. As the pressure-sensitive adhesive sheet, for example, an acrylic pressure-sensitive adhesive or the like is used (see Patent Document 2).

Examples of conventional methods for improving the adhesive properties of aromatic polysulfones include a method of changing the primary structure such as copolymerization of polymers, and alloying with another type of polymer. However, depending on the type of comonomer to be copolymerized or the type of polymer to be alloyed, it is necessary to optimize the type of comonomer, the type of polymer and the composition ratio, since they adversely affect the physical properties of the polymer that may be intrinsic, such as heat resistance. Further, the aromatic polysulfones obtained in this manner do not necessarily have sufficient adhesive properties (see Patent Document 3). Therefore, an aromatic polysulfone excellent in adhesive properties and an aromatic polysulfone composition containing this aromatic polysulfone have been desired.

CITATION LIST

Patent Documents

[Patent Document 1] Published Japanese Translation No. 2012-509375 of the PCT International Publication
[Patent Document 2] Japanese Unexamined Patent Application, First Publication No. 2014-169419
[Patent Document] Japanese Unexamined Patent Application, First Publication No. Hei 5-214291

SUMMARY OF INVENTION

Technical Problem

The present invention has been made in view of such circumstances, with an object of providing an aromatic polysulfone having excellent adhesive properties. In addition, another object of the present invention is to provide an aromatic polysulfone composition containing this aromatic polysulfone.

Solution to Problem

As a result of extensive studies in order to solve the above-mentioned problems, the inventors of the present invention have found that an aromatic polysulfone having excellent adhesive properties can be obtained when an aromatic polysulfone having least one highly polar functional group at its terminal is contained and a ratio of the above-mentioned aromatic polysulfone having a highly polar functional group with respect to the combined total of all the aromatic polysulfones is 19% by mass or more and 100% by mass or less. Furthermore, they discovered that an aromatic polysulfone excellent in adhesive properties and excellent in solvent resistance can be obtained when the ratio of the aromatic polysulfone having at least one highly polar functional group at its terminal with respect to the combined total of all the aromatic polysulfones is more than 20% by mass and not more than 100% by mass, and completed the present invention.

One aspect of the present invention provides an aromatic polysulfone in which an aromatic polysulfone having at least one highly polar functional up at the terminal (hereinafter sometimes referred to as an aromatic polysulfone having a highly polar functional group) is contained, and a ratio of the aromatic polysulfone having a highly polar functional group with respect to the combined total of all the aromatic polysulfones is 19% by mass or more and 100% by mass or less.

That is, in one aspect of the present invention, an aromatic polysulfone is provided, in which a ratio obtained by dividing an area of a signal attributed to an aromatic polysulfone having a highly polar functional group with a total area of all the signals attributed to the aromatic polysulfone is 19% by mass or more and 100% by mass or less in a chromatogram obtained when measured by a gel permeation chromatography (hereinafter sometimes referred to as GPC) method under the following conditions.

[Conditions]
Sample injection volume: 5 µL
Column: "Shodex KF-803" manufactured by Showa Denko K.K.
Column temperature: 40° C.
Eluent: N,N-dimethylformamide
Eluent flow rate: 0.5 mL/min
Detector: ultraviolet-visible spectrophotometer (UV)
Detection wavelength: 277 nm In one aspect of the present invention, it is preferable that the above ratio is more than 20% by mass and 100% by mass or less.

In one aspect of the present invention, it is preferable to have a repeating unit represented by a formula (1).

[In the formula (1), $Ph^1$ and $Ph^2$ each independently represent a phenylene group. One or more hydrogen atoms of the phenylene group may be each independently substituted with an alkyl group, an aryl group or a halogen atom.]

In one aspect of the present invention, it is preferable to have 0.5 to 10 phenolic hydroxyl groups per 100 repeating units represented by the formula (1).

One aspect of the present invention provides an aromatic polysulfone composition containing the above aromatic polysulfone.

One aspect of the present invention preferably further includes a filler.

That is, the present invention relates to the following.

[1] An aromatic polysulfone which is an aromatic polysulfone containing an aromatic polysulfone having at least one highly polar functional group at its terminal, wherein in the aforementioned aromatic polysulfone, an area of a signal attributed to the aforementioned aromatic polysulfone having a highly polar functional group with respect to a total area of all signals attributed to the aforementioned aromatic polysulfone in a chromatogram obtained by measurement through a gel permeation chromatography method under the following conditions is 19% or more and 100% or less.

[Conditions]
Sample injection volume: 5 μL
Column: "Shodex KF-803" manufactured by Showa Denko K.K.
Column temperature: 40° C.
Eluent: N,N-dimethylformamide.
Eluent flow rate: 0.5 mL/min
Detector: ultraviolet-visible spectrophotometer (UV)
Detection wavelength: 277 nm

[2] The aromatic polysulfone according to [1], wherein the area of the signal attributed to the aforementioned aromatic polysulfone having a highly polar functional group is more than 20% and 100% or less with respect to the total area of all signals attributed to the aforementioned aromatic polysulfone.

[3] The aromatic polysulfone according to [1] or [2], which has a repeating unit represented by a formula (1):

[In the formula (1), $PH^1$ and $Ph^2$ each independently represent a phenylene group, and at least one hydrogen atom in the aforementioned phenylene group may be each independently substituted with an alkyl group, an aryl group or a halogen atom.]

[4] The aromatic polysulfone according to [3], which has 0.5 to 10 phenolic hydroxyl groups per 100 repeating units represented by the aforementioned formula (1.

[5] An aromatic polysulfone composition including the aromatic polysulfone according to any one of [1] to [4].

[6] The aromatic polysulfone composition according to [5], further including a filler.

Advantageous Effects of Invention

According to one aspect of the present invention, an aromatic polysulfone having excellent adhesive properties is provided. In addition, an aromatic polysulfone composition containing this aromatic polysulfone is also provided.

DESCRIPTION OF EMBODIMENTS

<Aromatic Polysulfone>

Figure 1:
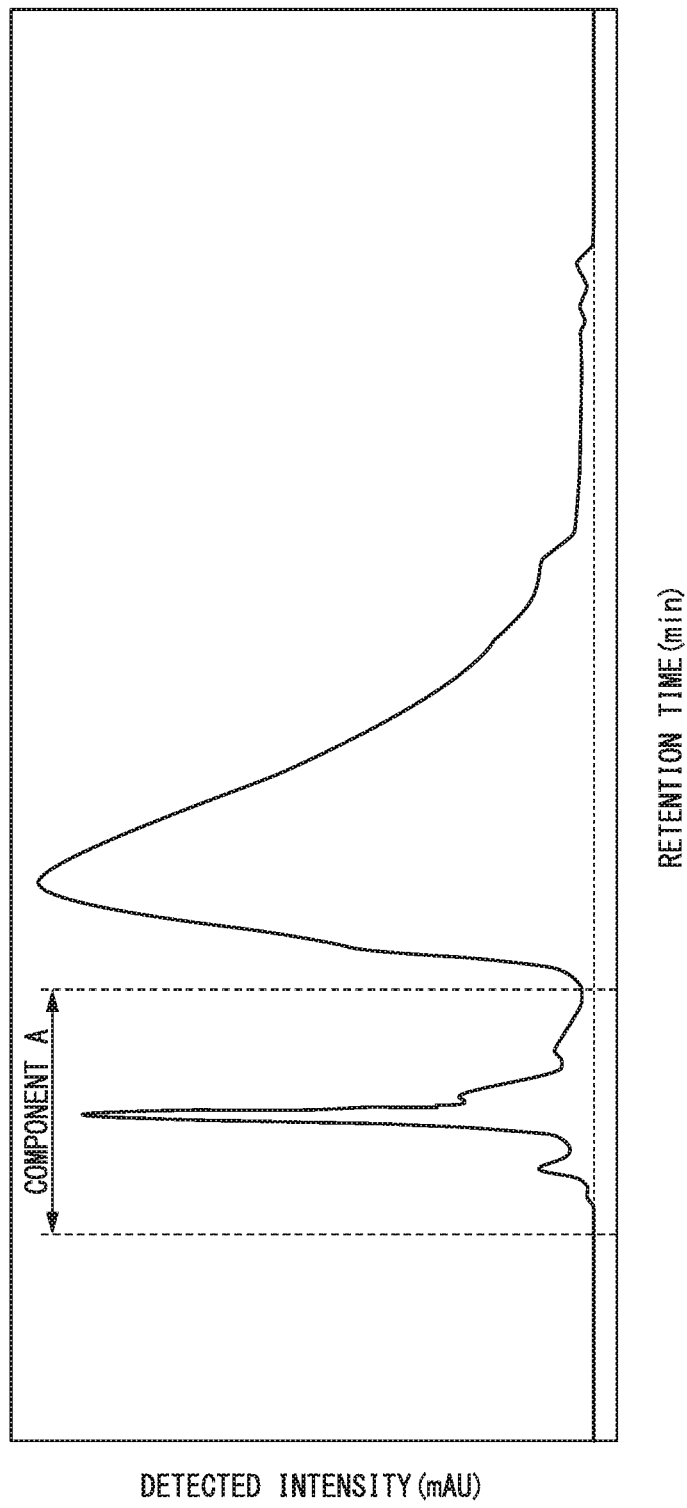
FIG. 1 is a chromatogram obtained when measured by a GPC method.

Typically, an aromatic polysulfone of the present embodiment is a resin including a repeating unit that contains a divalent aromatic group (a residue formed by removing, from an aromatic compound, two hydrogen atoms bonded to its aromatic ring), a sulfonyl group ($-SO_2-$) and an oxygen atom.

The aforementioned aromatic polysulfone preferably has a repeating unit represented by a formula (1) (hereinafter may be referred to as "repeating unit (1)" in some cases). In particular, an aromatic polysulfone having the repeating unit (1) is referred to as an aromatic polyether sulfone. Furthermore, at least one other repeating unit such as a repeating unit represented by a formula (2) (hereinafter referred to as "repeating unit (2)" in some cases) or a repeating unit represented by a formula (3) (hereinafter referred to as "repeating unit (3)" in some cases) may be contained.

[In the formula (1), $Ph^1$ and $Ph^2$ each independently represent a phenylene group; and one or more hydrogen atoms in the aforementioned phenylene group may be each independently substituted with an alkyl group, an aryl group or a halogen atom.]

[In the formula (2), $Ph^3$ and $Ph^4$ each independently represent a phenylene group; one or more hydrogen atoms in the aforementioned phenylene group may be each independently substituted with an alkyl group, an aryl group or a halogen atom; and R represents an alkylidene group, an oxygen atom or a sulfur atom.]

[In the formula (3), $Ph^5$ represents a phenylene group; one or more hydrogen atoms in the aforementioned phenylene group may be each independently substituted with an alkyl group, an aryl group or a halogen atom; n represents an integer of 1 to 3; and when n is 2 or more, a plurality of $Ph^5$ groups may be the same as or different from each other.]

The phenylene group represented by any one of $Ph^1$ to $Ph^5$ may be each independently a p-phenylene group, an m-phenylene group or an o-phenylene group, but it is preferably a p-phenylene group.

The alkyl group which may substitute the hydrogen atom in the phenylene group is preferably an alkyl group having 1 to 10 carbon atoms. Examples of the alkyl group having 1 to 10 carbon atoms include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, a 2-ethylhexyl group, an n-octyl group and an n-decyl group.

The aryl group Inch may substitute the hydrogen atom in the phenylene group is preferably an aryl group having 6 to 20 carbon atoms. Examples of the aryl group having 6 to 20 carbon atoms include a phenyl group, an o-tolyl group, an m-tolyl group, a p-tolyl group, a 1-naphthyl group and a 2-naphthyl group.

Examples of the halogen atom which may substitute the hydrogen atom in the phenylene group include a fluorine atom, a chlorine atom, a bromine atom and an iodine atom.

In the case where the hydrogen atom in the phenylene group is substituted with these functional groups, the number thereof is each independently preferably 2 or less, and more preferably 1, for each of the phenylene groups.

The alkylidene group represented by R is preferably an alkylidene group having 1 to 5 carbon atoms. Examples of the alkylidene group having 1 to 5 carbon atoms include a methylene group, an ethylidene group, an isopropylidene group and a 1-butylidene group.

The aromatic polysulfone of the present embodiment preferably includes 50 mol % or more and more preferably 80 mol % or more of the repeating unit (1), with respect to the total amount of all the repeating units constituting the aromatic polysulfone, and as the repeating unit, it is still more preferable to substantially include only the repeating unit (1), and it is particularly preferable to include only the repeating unit (1).

That is, the aromatic polysulfone of the present embodiment preferably includes 50 mol % or more and 100 mol % or less, more preferably 80 mol % or more and 100 mol % or less and particularly preferably 100 mol % of the repeating unit (1), with respect to the total amount of all the repeating units constituting the aromatic polysulfone.

It should be noted that the aromatic polysulfone may have two or more of the repeating units (1) to (3) independently of each other.

Further, the aromatic polysulfone of the present embodiment includes an aromatic polysulfone having at least one highly polar functional group at its terminal. In the present specification, "an aromatic polysulfone having at least one highly polar functional group at its terminal" may be simply referred to as "aromatic polysulfone having a highly polar functional group".

As one aspect, the aromatic polysulfone of the present embodiment may be a mixture of an aromatic polysulfone having a highly polar functional group and an aromatic polysulfone having no highly polar functional group, or may consist of only an aromatic polysulfone having a highly polar functional group.

A "highly polar functional group" specifically means a polar functional group having an acid dissociation constant smaller than that of the carboxyl group. The highly polar functional group can interact with the surface of an adhesive or pressure-sensitive adhesive, or a reactive functional group present on the surface to chemically or electrically couple the aromatic polysulfone to the surface. Since the aromatic polysulfone of the present embodiment contains such an aromatic polysulfone having a highly polar functional group, it is excellent in adhesive properties.

Such a highly polar functional group is preferably, for example, a sulfonic acid group (—$SO_2OH$), a sulfinic acid group (—$SO_2H$) or a salt thereof. An aromatic polysulfone containing a sulfonic acid group, a sulfinic acid group or a salt thereof can be obtained by decomposition of the repeating unit (1) in the aromatic polysulfone and reaction with moisture in the air or in the resin. Further, it can be obtained by replacing the terminal functional group (hydroxyl group or halogen atom) of the polymer with a compound having a highly polar functional group after the polymerization reaction to be described later.

Here, the type of highly polar functional group can be identified by a matrix-assisted laser desorption ionization (sometimes abbreviated as MALDI) method after fractionating the aromatic polysulfone having a highly polar functional group in the GPC measurement described later.

A ratio of the aromatic polysulfone having a highly polar functional group with respect to the combined total of all the aromatic polysulfones (that is, a content ratio of the aromatic polysulfone having a highly polar functional group with respect to the total mass of aromatic polysulfones) is 19% by mass or more and 100% by mass or less, may be 20% by mass or more and 100% by mass or less, and may be 20% by mass or more and 39% by mass or less.

When the ratio of the aromatic polysulfone having a highly polar functional group is within the above range, the adhesive properties of the aromatic polysulfone can be improved.

For aromatic polysulfones, not only adhesive properties but also solvent resistance may be required depending on the application. However, conventional aromatic polysulfones do not necessarily have sufficient solvent resistance. On the other hand, it was discovered that in the present embodiment, both the adhesive properties and solvent resistance of the aromatic polysulfone can be improved when the ratio of the aromatic polysulfone having a highly polar functional group with respect to the combined total of all the aromatic polysulfones (that is, the content ratio of the aromatic polysulfone having a highly polar functional group with respect to the total mass of aromatic polysulfones) is more than 20% by mass and not more than 100% by mass, preferably 24% by mass or more and 100% by mass or less, and more preferably 24% by mass or more and 39% by mass or less.

Here, the content ratio of the aromatic polysulfone having a highly polar functional group with respect to the total mass of the aromatic polysulfone is measured by a gel permeation chromatography (GPC) method. More specifically, in a chromatogram obtained when measured by the GPC method under the following conditions (measurement conditions and analysis conditions), it is obtained by dividing an area of a signal attributed to the aromatic polysulfone having a highly polar functional group (hereinafter referred to as "component A" in some cases) with a total area of all the signals attributed to the aromatic polysulfones.

[Measurement Conditions]
Sample injection volume: 5 μL
Column: "Shodex KF-803" manufactured by Showa Denko K.K.
Column temperature: 40° C.
Eluent: N,N-dimethylformamide
Eluent flow rate: 0.5 mL/min
Detector: ultraviolet-visible spectrophotometer (UV)
Detection wavelength: 277 nm

[Analysis Conditions]
Software: "LabSolutions" manufactured by Shimadzu Corporation
Width: 70 seconds
Slope: 1,000 uV/min
Drift: 0 uV/min
Minimum area/height: 1,000 counts
Analysis start time: 0 minutes
Analysis end time: 22 minutes FIG. 1 is a chromatogram obtained when measured by the GPC method under the above conditions.

The above-described "Shodex KF-803" manufactured by Showa Denko K.K. is a gel permeation chromatography column packed with a styrene divinylbenzene copolymer resin and having an inner diameter×height of 8.0 mm×300 mm, and the styrene divinylbenzene copolymer resin has a particle size of 6 μm.

The component A shown in FIG. 1 is attributed to an aromatic polysulfone having a highly polar functional group. In the present embodiment, a ratio obtained by dividing the area of the component A by the total area of all the signals attributed to aromatic polysulfones corresponds to a ratio of the mass of the aromatic polysulfone having a highly polar functional group corresponding to the component A with respect to the mass of the combined total of all the aromatic polysulfones (the total mass of aromatic polysulfones). It should be noted that since the aromatic polysulfone having at least one highly polar functional group at its terminal and the aromatic polysulfone having no highly polar functional group at its terminal have the same main chain skeleton, molar extinction coefficients thereof with respect to the detection light (UV: 277 nm) are substantially the same. Therefore, the area of the detected signal corresponds to the mass.

That is, as one aspect, the aromatic polysulfone of the present embodiment is an aromatic polysulfone containing an aromatic polysulfone having at least one highly polar functional group at its terminal, wherein a ratio obtained by dividing an area of a signal attributed to the aforementioned aromatic polysulfone having a highly polar functional group by a total area of all the signals attributed to the aforementioned aromatic polysulfone in a chromatogram obtained by measurement through a gel permeation chromatography method under the above conditions is 19% or more and 100% or less. The ratio may be 20% or more and 100% or less, or may be 20% or more and 39% or less.

Furthermore, since both the adhesive properties and solvent resistance can be improved, the ratio may be more than 20% and 100% or less, may be 24% or more and 100% or less, and may be 24% or more and 39% or less. As another aspect, the aromatic polysulfone of the present embodiment is an aromatic polysulfone containing an aromatic polysulfone having at least one highly polar functional group at its terminal, wherein an area of a signal attributed to the aforementioned aromatic polysulfone having a highly polar functional group with respect to a total area of all signals attributed to the aforementioned aromatic polysulfone in a chromatogram obtained by measurement through a gel permeation chromatography method under the above conditions is 19% or more and 100% or less. Further, the area of the signal attributed to the aforementioned aromatic polysulfone having a highly polar functional group may be 20% or more and 100% or less, or may be 20% or more and 39% or less, with respect to the total area of all the signals attributed to the aforementioned aromatic polysulfone.

Furthermore, since both the adhesive properties and solvent resistance can be improved, the area of the signal attributed to the aforementioned aromatic polysulfone having a highly polar functional group may be more than 20% and 100% or less, may be 24% or more and 100% or less, or may be 24% or more and 39% or less, with respect to the total area of all the signals attributed to the aforementioned aromatic polysulfone.

Although a solvent to which a salt such as lithium bromide is added at a concentration of 10 mM (1 mM=1×$10^{-3}$ mol/L) is usually used as an eluent in a GPC measurement of a polymer having a polar group, under the measurement conditions of the present invention, an eluent containing no such salt is used. Since an aromatic polysulfone having a highly polar functional group and the stationary phase are electrically repulsed by using an eluent containing no salt, the retention time can be made faster for the aromatic polysulfone having a highly polar functional group, as compared with aromatic polysulfones having no highly polar functional group. This makes it possible to separate a peak derived from the aromatic polysulfone having a highly polar functional group and peaks derived from aromatic polysulfones having no highly polar functional group, and measurement with high reproducibility becomes possible.

When lithium bromide is added to the eluent, component A is not identified. In other words, then lithium bromide is not added to the eluent, the component A is identified. By not adding lithium bromide to the eluent, the component A can be identified as a signal having a retention time faster than that of a signal attributed to an aromatic polysulfone having no highly polar functional group at its terminal due to an ion exclusion effect.

Here, the signal of the aromatic polysulfone having no highly polar functional group at its terminal c be identified by being compared with the retention time of the aromatic polysulfone when N,N-dimethylformamide added with 10 mM lithium bromide is used as the eluent. That is, the retention time of the aromatic polysulfones ((aromatic polysulfone having at least one highly polar functional group at its terminal)+(aromatic polysulfone having no highly polar functional group at its terminal)) when N,N-dimethylformamide prepared by adding 10 mM lithium bromide is used as the eluent and the retention time of the aromatic polysulfone having no highly polar functional group at its terminal when N,N-dimethylformamide prepared without adding 10 mM lithium bromide is used as the eluent are substantially the same. Further, a signal having a retention time earlier than the signal of the aromatic polysulfone having no highly polar functional group at its terminal is assigned as a signal (component A) of an aromatic polysulfone having at least one highly polar functional group at its terminal.

Furthermore, in the aromatic polysulfone of the present embodiment, it is preferable to include 0.5 to 10 phenolic hydroxyl groups per 100 repeating units represented by the formula (1). When the number of reactive phenolic hydroxyl groups per 100 repeating units represented by the formula (1) is from 0.5 or more to 10 or less, the aromatic polysulfone can be finely dispersed when alloying a thermoplastic resin or thermosetting resin with the aromatic polysulfone.

As another aspect, the number of phenolic hydroxyl groups may be 2 or more and 3 or less, and may be 2.1 or more and 2.6 or less, per 100 repeating units represented by the formula (1).

Here, the number (A) of phenolic hydroxyl groups per 100 repeating units represented by the formula (1) is measured by an NMR method. More specifically, in the $^1$H-NMR measurement, it can be calculated based on the following formula (S1) using an area (x) of a signal attributed to four hydrogen atoms bonded to the phenol group in the repeating unit (1) and an area (y) of a signal attributed to two hydrogen atoms respectively bonded to the carbon atom two atoms away from the phenolic hydroxyl group.

$$A=(y\times 100/x)\times 2 \quad (S1)$$

The measurement solvent in the $^1$H-NMR measurement is not particularly limited as long as it is a solvent capable of $^1$H-NMR measurement and capable of dissolving aromatic polysulfones, but deuterated dimethyl sulfoxide or the like is preferable.

The reduced viscosity (unit: dL/g) of the aromatic polysulfone of the present embodiment is preferably 0.18 or more, and more preferably 0.22 or more and 0.80 or less. The higher the reduced viscosity of aromatic polysulfone, the easier it is to improve heat resistance and the strength and rigidity when formed into a molded article, but if it is too high, the melt temperature and melt viscosity tend to be high and the fluidity tends to be low.

Here, the reduced viscosity is a value measured at a resin concentration of 1.0 g/100 ml in an N,N-dimethylformamide solution at 25° C., using an Ostwald type viscosity tube.

The number average molecular weight (Mn) of the aromatic polysulfone of the present embodiment is preferably, for example, 6,000 or more and 40,000 or less.

The weight average molecular weight (Mw) of the aromatic polysulfone of the present embodiment is preferably, for example, 9,000 or more and 90,000 or less.

The Mw/Mn value (polydispersity) of the aromatic polysulfone of the present embodiment is preferably 1.5 or more and 3.0 or less.

The values of Mn, Mw and Mw/Mn can be obtained by a method described in <Measurement of Mn and Mw values of aromatic polysulfones, and calculation of Mw/Mn value> to be described later.

<Method for Producing Aromatic Polysulfone>

The aromatic polysulfone of the present embodiment can be produced by using an aromatic dihalogenosulfone compound and an aromatic dihydroxy compound as monomers and subjecting these monomers to a polycondensation reaction in an organic solvent in the presence of a base.

[Monomer]

The aromatic dihalogenosulfone compound and the aromatic dihydroxy compound correspond to the repeating unit constituting the aromatic polysulfone. Further, the aromatic dihalogenosulfone compound may be a compound having an aromatic ring, a sulfonyl group and two halogeno groups in one molecule. Moreover, the aromatic dihydroxy compound may be a compound having an aromatic ring and two hydroxy groups in one molecule.

For example, an aromatic polysulfone having the repeating unit (1) can be produced by sing a compound represented by a formula (4) (hereinafter may be referred to as "compound (4)" in some cases) as the aromatic dihalogenosulfone compound, and using a compound represented by a formula (5) (hereinafter may be referred to as "compound (5)" in some cases) as the aromatic dihydroxy compound.

Further, an aromatic polysulfone having the repeating unit (1) and the repeating unit (2) can be produced by using the compound (4) as the aromatic dihalogenosulfone compound and using a compound represented by a formula (6) (hereinafter may be referred to as "compound (6)" in some cases) as the aromatic dihydroxy compound.

Moreover, an aromatic polysulfone having the repeating unit (1) and the repeating unit (3) can be produced by using the compound (4) as the aromatic dihalogenosulfone compound and using a compound represented by a formula (7) (hereinafter may be referred to as "compound (7)" in some cases) as the aromatic dihydroxy compound.

(4)

[In the formula (4), $X^1$ and $X^2$ each independently represent a halogen atom; and $Ph^1$ and $Ph^2$ are the same as defined above.]

(5)

[In the formula (5), $PH^1$ and $PH^2$ are the same as define above.]

(6)

[In the formula (6), $Ph^3$, $PH^4$ and R are the same as defined above.]

(7)

[In the formula (7), $PH^5$ and n are the same as defined above.]

As the halogen atom represented by $X^1$ and $X^2$, the same halogen atom which may substitute the hydrogen atom of the aforementioned phenylene group can be mentioned.

Examples of the compound (4) include bis(4-chlorophenyl) sulfone and 4-chlorophenyl-3',4'-dichlorophenyl sulfone.

Examples of the compound (5) include bis(4-hydroxyphenyl) sulfone, bis(4-hydroxy-3,5-dimethylphenyl) sulfone and bis(4-hydroxy-3-phenylphenyl) sulfone.

Examples of the compound (6) include 2,2-bis(4-hydroxyphenyl) propane, 2,2-bis(4-hydroxyphenyl) hexafluoropropane, bis(4-hydroxyphenyl) sulfide, bis(4-hydroxy-3-methylphenyl) sulfide and bis(4-hydroxyphenyl) ether.

Examples of the compound (7) include hydroquinone, resorcin, catechol, phenylhydroquinone, 4,4'-dihydroxybiphenyl, 2,2'-dihydroxybiphenyl, 3,5,3',5'-tetramethyl-4,4'-dihydroxybiphenyl, 2,2'-diphenyl-4,4'-dihydroxybiphenyl and 4,4'-dihydroxy-p-quaterphenyl.

As an example of the aromatic dihalogenosulfone compound other than the compound (4), 4,4'-bis(4-chlorophenylsulfonyl) biphenyl can be mentioned.

In the present embodiment, instead of all or part of the aromatic dihalogenosulfone compound and the aromatic dihydroxy compound, a compound having a halogeno group and a hydroxy group in a molecule such as 4-hydroxy-4'-(4-chlorophenylsulfonyl) biphenyl can also be used.

In the present embodiment, depending on the type of intended aromatic polysulfone, any one of the aromatic dihalogenosulfone compound and the aromatic dihydroxy compound may be used alone, or two or more of them may be used in combination.

[Base, Organic Solvent]

Polycondensation between the aromatic dihalogenosulfone compound and the aromatic dihydroxy compound is preferably carried out using an alkali metal salt of carbonic acid as a base. Further, it is preferably carried out in an organic solvent as a polycondensation solvent, and more preferably carried out using an alkali metal salt of carbonic acid as a base and in an organic solvent.

The alkali salt of carbonic acid may be an alkali carbonate which is a normal salt (that is, an alkali metal carbonate), or an alkali bicarbonate which is an acid salt, (that is, an alkali hydrogencarbonate or an alkali metal hydrogencarbonate), or it may be a mixture of these (an alkali carbonate and an alkali bicarbonate). As the alkali carbonate, for example, sodium carbonate, potassium carbonate and the like are preferable. As the alkali bicarbonate, for example, sodium bicarbonate (also referred to as sodium hydrogen carbonate), potassium bicarbonate (also referred to as potassium hydrogen carbonate) and the like are preferable.

The type of the organic solvent is not particularly limited, but it is preferably an aprotic polar solvent. Further, the boiling point of the organic solvent is not particularly limited, but it is preferably, for example, 100° C. or more and 400° C. or less, and more preferably 100° C. or more and 350° C. or less.

Examples of such organic solvents include sulfoxides such as dimethylsulfoxide; amides such as dimethylformamide, dimethylacetamide and N-methyl-2-pyrrolidone; sulfones such as sulfolane (also referred to as 1,1-dioxosilane), dimethylsulfone, diethylsulfone, diisopropyl sulfone and diphenyl sulfone; and a compound having a urea skeleton in which a hydrogen atom bonded to the nitrogen atom may be substituted such as 1,3-dimethyl-2-imidazolidinone and 1,3-diethyl-2-imidazolidinone.

Among them, as the organic solvent, dimethylsulfoxide, dimethylformamide, dimethylacetamide, N-methyl-2-pyrrolidone, sulfolane, diphenylsulfone or 1,3-dimethyl-2-imidazolidinone is preferable, and dimethylsulfoxide, dimethylformamide, dimethylacetamide, N-methyl-2-pyrrolidone, sulfolane or 1,3-dimethyl-2-imidazolidinone is more preferable.

One of these organic solvents may be used alone or two or more of them may be used in combination.

[Polymerization]

In the method for producing an aroma polysulfone, as a first stage, an aromatic dihalogenosulfone compound and an aromatic dihydroxy compound are dissolved in an organic solvent. As a second stage, an alkali metal salt of carbonic acid is added to the solution obtained in the first stage to subject the aromatic dihalogenosulfone compound and the aromatic dihydroxy compound to a polycondensation reaction. As a third stage, an unreacted base, by-products (alkali halide when an alkali metal salt is used as a base) and the organic solvent are reduced from the reaction mixture obtained in the second stage to obtain an aromatic polysulfone.

The melting temperature in the first stage is preferably 40° C. or more and 180° C. or less. Further, the reaction temperature of the polycondensation in the second stage is preferably 180° C. or more and 400° C. or less. If a side reaction does not occur, the higher the poly-condensation temperature, the faster the intended polycondensation progresses, so that the degree of polymerization of the obtained aromatic polysulfone increases. As a result, the reduced viscosity of the aromatic polysulfone tends to increase. However, in fact, as the polycondensation temperature increases, side reactions similar to those described above are more likely to occur, and the degree of polymerization of the obtained aromatic polysulfone decreases. Therefore, also by taking the extent of these side reactions into consideration, it is necessary to adjust the polycondensation temperature, so that an aromatic polysulfone having a predetermined reduced viscosity can be obtained.

The blending ratio of the aromatic dihalogenosulfone compound with respect to the aromatic dihydroxy compound is preferably 80 mol % or more and 120 mol or less, and more preferably 90 mol % or more and 110 mol % or less.

The ratio of the alkali metal salt of carbonic acid used with respect to the aromatic dihydroxy compound is, as the alkali metal, preferably 90 mol % or more and 130 mol % or less, and more preferably 95 mol % or more and 120 mol % or less.

If a side reaction does not occur, the higher the ratio of the alkali metal salt of carbonic acid used, the faster the intended polycondensation progresses, so that the degree of polymerization of the obtained aromatic polysulfone increases. As a result, the reduced viscosity of the aromatic polysulfone tends to increase.

However, in fact, as the ratio of the alkali metal salt of carbonic acid used increases, side reactions similar to those described above are more likely to occur, and the degree of polymerization of the obtained aromatic polysulfone decreases. Therefore, also by taking the extent of these side reactions into consideration, it is necessary to adjust the ratio of the alkali metal salt of carbonic acid used, so that an aromatic polysulfone having a predetermined reduced viscosity can be obtained.

Usually, in the polycondensation in the second stage, the temperature is gradually raised to the reflux temperature of the organic solvent, while reducing the amount of water generated as a by-product. After reaching the reflux temperature of the organic solvent, it is preferable to further maintain the temperature for a predetermined time. The predetermined time is preferably 1 hour or more and 50 hours or less, and more preferably 2 hours or more and 30 hours or less. If a side reaction does not occur, the longer the polycondensation time, the more the intended polycondensation progresses, so that the degree of polymerization of the obtained aromatic polysulfone increases. As a result, the reduced viscosity of the aromatic polysulfone tends to increase. However, in fact, as the polycondensation time increases, side reactions similar to those described above are allowed to proceed, and the degree of polymerization of the obtained aromatic polysulfone decreases.

Therefore, also by taking the extent of these side reactions into consideration, it is necessary to adjust the polycondensation time, so that an aromatic polysulfone having a predetermined reduced viscosity can be obtained.

In order to obtain an aromatic polysulfone having at a one highly polar functional group at its terminal, after the polymerization reaction, the functional group at the terminal of the polymer may be replaced by a compound having a highly polar functional group. More specifically, an aromatic polysulfone having at least one highly polar functional group at its terminal can be obtained, by using a compound having a functional group reactive with the aforementioned $X^1$, $X^2$ or phenolic hydroxyl group at the terminal of the polymer and a highly polar functional group (hereinafter may be referred to as an end capping agent), and reacting with the obtained polymer.

This reaction can be easily carried out by adding an end capping agent at the time when the polymerization reaction is completed. Specific examples of the end capping agent include 4-hydroxybenzenesulfonic acid, 3-hydroxybenzenesulfonic acid. (4-hydroxyphenyl) phosphonic acid and alkali metal salts thereof.

In the third stage, first, from the reaction mixture obtained in the second stage, the unreacted alkali metal salt of carbonic acid and an alkali halide generated as a by-product are reduced through filtration, extraction, centrifugation or the like, thereby obtaining a solution in which an aromatic polysulfone is dissolved in an organic solvent (hereinafter may be referred to as "aromatic polysulfone solution" in some cases). Then, by reducing the organic solvent from the aromatic polysulfone solution, an aromatic polysulfone is obtained.

As a method for reducing the organic solvent from the aromatic polysulfone solution, for example, a method of directly reducing the organic solvent from the aromatic polysulfone solution under reduced pressure or increased pressure can be mentioned. In addition, as another method, a method of mixing an aromatic polysulfone solution and a poor solvent of aromatic polysulfone to precipitate the aromatic polysulfone and reducing the organic solvent by filtration, centrifugation or the like can be mentioned. In the present embodiment, if necessary, the precipitated aromatic polysulfone may be repeatedly washed with a poor solvent of aromatic polysulfone.

The aromatic polysulfone obtained in this manner is a mixture in which an aromatic polysulfone having a highly polar functional group and an aromatic polysulfone having no highly polar functional group are mixed in a predetermined ratio.

In the present embodiment, by performing a predetermined operation on the mixture, the ratio of the aromatic polysulfone having a highly polar functional group with respect to the combined total of all the aromatic polysulfones (that is, the content ratio of the aromatic polysulfone having a highly polar functional group with respect to the total mass of aromatic polysulfones) can be adjusted.

Hereinafter, an example of a method for adjusting the content ratio of the aromatic polysulfone having a highly polar functional group will be described in detail.

First, a mixture of aromatic polysulfones and a predetermined solvent are mixed. As the predetermined solvent, a solvent which is more likely to dissolve an aromatic polysulfone having no highly polar functional group than an aromatic polysulfone having a highly polar functional group is used. As such a solvent, dichloromethane, chloroform and the like can be mentioned. Among the s preferable to use dichloromethane because of the large solubility difference between these aromatic polysulfones.

When a mixture of aromatic polysulfones and a predetermined solvent are mixed, the aromatic polysulfone having no highly polar functional group is eluted from the mixture of aromatic polysulfones toward the predetermined solvent present around the mixture of aromatic polysulfones. At this time, although the aromatic polysulfone having a highly polar functional group is also eluted, since its elution amount is smaller than that of the aromatic polysulfone having no highly polar functional group, in a solution ((a portion of aromatic polysulfones)+(predetermined solvent)), the ratio of the aromatic polysulfone having a highly polar functional group is low. On the other hand, in the solid remaining without being eluted ((the remainder of the aromatic polysulfones)+(a small amount of the predetermined solvent)), since the ratio of the aromatic polysulfone having no highly polar functional group is reduced, as a result, the ratio of the aromatic polysulfone having a highly polar functional group is increased.

Subsequently, this mixture (mixture of aromatic polysulfones)+(predetermined solvent)) is separated into a solid and a solution by filtration, centrifugation or the like. By reducing the predetermined solvent respectively from the solid and the solution, it can be separated into a component containing a large amount of aromatic polysulfone having a highly polar functional group and a component containing a small amount of aromatic polysulfone having a highly polar functional group. As a method for reducing the predetermined solvent, the method exemplified as the method for reducing the organic solvent in the third stage can be mentioned.

Such an operation may be repeated until the aromatic polysulfone having a highly polar functional group reaches a desired ratio. Further, it is also possible to prepare two or more types of aromatic polysulfones differing in the ratio of aromatic polysulfone having a highly polar functional group and blend there appropriately in accordance with the intended ratio of the aromatic polysulfone having a highly polar functional group.

The ratio of the aromatic polysulfone having a highly polar functional group contained in the aromatic polysulfone of the present embodiment can be adjusted in this manner.

<Aromatic Polysulfone Composition>

The aromatic polysulfone composition of the present embodiment preferably contains the above-mentioned aromatic polysulfone and also contains a filler. In addition, it may further contain a resin other than the aromatic polysulfone. In the aromatic polysulfone composition of the present embodiment, content of the aromatic polysulfone is preferably from 20 to 95% by mass with respect to the total mass of the aromatic polysulfone composition.

[Filler]

Examples of the filler in the present embodiment include a fibrous filler, a plate filler, a spherical filler, a powder filler, an irregularly shaped filler and a whisker.

Examples of the fibrous filler include glass fibers, PAN-based carbon fibers, pitch-based carbon fibers, silica alumna fibers, silica fibers, alumina fibers, other ceramic fibers, liquid crystal polymer (sometimes abbreviated as LCP) fibers, aramid fibers and polyethylene fibers. Further, whiskers such as wollastonite and potassium titanate fibers can also be mentioned.

Examples of the plate filler include talc, mica, graphite and wollastonite.

Examples of the spherical filler include; glass beads and glass balloons.

Examples of the powder filler include calcium carbonate, dolomite, clay barium sulfate, titanium oxide, carbon black, conductive carbon and fine particulate silica.

Examples of the irregularly shaped filler include glass flakes and modified cross-section glass fibers.

The content of the filler is preferably from 0 to 250 parts by mass, more preferably from 0 to 70 parts by mass, still more preferably from 0 to 50 parts by mass, and particularly preferably from 0 to 25 parts by mass, with respect to 100 parts by mass of the aromatic polysulfone.

Examples of resins other than the aromatic polysulfone include polyamides, polyesters, polyphenylene sulfides, polycarbonates, polyphenylene ethers, aromatic polyketones, polyether imides, phenol resins, epoxy resins, polyimide resins and modified products thereof.

The content of the resin other than the aromatic polysulfone is preferably from 5 to 2,000 parts by mass, more preferably from 10 to 1,000 parts by mass, and still more preferably from 20 to 500 parts by mass, with respect to 100 parts by mass of the aromatic polysulfone.

[Organic Solvent]

The aromatic polysulfone composition of the present embodiment may further contain an organic solvent. It should be noted that the organic solvent may be added later when preparing the aromatic, polysulfone composition, or may be contained in advance in the aromatic polysulfone. As such an organic solvent, the same organic solvents as those exemplified in the production method of the present embodiment can be used.

The content of the organic solvent is preferably from 0 to 1 part by mass with respect to 100 parts by mass of the aromatic polysulfone.

[Other Components]

The aromatic polysulfone composition of the present embodiment may contain various materials as necessary, as long as the effects of the present invention are not impaired. Examples of such materials include coloring components, lubricants, various surfactants, antioxidants, heat stabilizers, various other stabilizers, ultraviolet absorbers and antistatic agents.

The content of other components is preferably from 0 to 1 part by mass with respect to 100 parts by mass of the aromatic polysulfone.

As one aspect, the aromatic polysulfone composition of the present embodiment includes the above-mentioned aromatic polysulfone, and at least one component selected from the group consisting of a filler, a resin other than the aromatic polysulfone, an organic solvent, and other components.

According to the present embodiment, an aromatic polysulfone excellent in adhesive properties and an aromatic polysulfone composition containing the aromatic polysulfone are provided.

Another aspect of the aromatic polysulfone of the present embodiment is an aromatic polysulfone including an aromatic polysulfone having at least one highly polar functional group at its terminal, wherein the aforementioned aromatic polysulfone includes a repeating unit represented by the above formula (1), preferably a repeating unit obtained by a polycondensation reaction of bis(4-chlorophenyl) sulfone with bis(4-hydroxyphenyl) sulfone;

an area of a signal attributed to the aforementioned aromatic polysulfone having a highly polar functional group with respect to a total area of all signals attributed to the aforementioned aromatic polysulfone in a chromatogram obtained by measurement through a gel permeation chromatography method under the following conditions is 19% or more and 100% or less, preferably 20% or more and 39% or less, and more preferably 24% or more and 39% or less:

[Conditions]

Sample injection volume: 5 μL

Column: "Shodex KF-803" manufactured by Showa Denko K.K.

Column temperature: 40° C.

Eluent: N,N-dimethylformamide.

Eluent flow rate: 0.5 mL/min

Detector: ultraviolet-visible spectrophotometer (UV)

Detection wavelength: 277 nm

EXAMPLES

Hereinafter, the present invention will be described in more detail with reference to examples and comparative examples, but the present invention is not limited thereto.

It should be noted that in these examples, measurement and evaluation of aromatic polysulfones were carried out under the following conditions.

<Measurement of Mn and Mw Values of Aromatic Polysulfones, and Calculation of Mw/Mn Value>

The weight average molecular weight (Mw), number average molecular weight (Mn) and polydispersity (Mw/Mn) of aromatic polysulfones were determined by GPC measurement. It should be noted that both Mn and Mw values were measured twice, and the average values thereof were determined as Mn and Mw, respectively to obtain the average value of Mw/Mn.

[Measurement Conditions]

Sample: 0.002 g of aromatic polysulfone was added to 1 mL of an N,N-dimethylformamide solution containing 10 mM lithium bromide Sample injection volume: 100 μL Column (stationary phase): Two columns of "TSKgel GMHHR-H" (7.8 mmφ×300 mm) manufactured by Tosoh Corporation were connected in series Column temperature: 40° C.

Eluent (mobile phase): N,N-dimethylformamide containing 10 mM (lithium bromide

Eluent flow rate: 0.8 mL/min

Detector: differential refractive index meter (RI)+light scattering photometer (LS)

Standard reagent: polystyrene

Molecular weight calculation method: absolute molecular weight was calculated from measurement result of light scattering photometer (LS)

<Measurement of Content of Aromatic Polysulfone having Highly Polar Functional Group (Content Measurement)>

The ratio of the aromatic polysulfone having a highly polar functional group with respect to the combined total of all the aromatic polysulfones (that is, the content ratio of the aromatic polysulfone having a highly polar functional group with respect to the total mass of aromatic polysulfones) was obtained by dividing the area of the signal attributed to the aromatic polysulfone having a highly polar functional group by the total area of signals attributed to the aromatic polysulfones in the GPC measurement.

[Measurement Conditions]

Apparatus: "Nexera X2" manufactured by Shimadzu Corporation

Sample: 0.001 g of aromatic polysulfone was added to 1 mL of an N,N-dimethylformamide solution Sample injection volume: 5 μL Column (stationary phase): "Shodex KF-803" (8.0 mmφ× 300 mm) manufactured by Showa Denko K.K.

Column temperature: 40° C.

Eluent (mobile phase): N,N-dimethylformamide

Eluent flow rate: 0.5 mL/min

Detector: ultraviolet-visible spectrophotometer (UV)

Detection wavelength: 277 nm

[Analysis Conditions]

Software: "LabSolutions" manufactured by Shimadzu Corporation

Width (W): 70 seconds

Slope (S): 1,000 uV/min

Drift (D): 0 uV/min

Minimum area/height (M): 1,000 counts

Analysis start time: 0 minutes

Analysis end time: 22 minutes

<Measurement of the Number of Phenolic Hydroxyl Groups in Aromatic Polysulfone>

The number (A) of phenolic hydroxyl groups per 100 repeating units represented by the formula (1) was determined by $^1$H-NMR measurement. More specifically, in the H-NMR measurement, it was calculated based on the following formula (S1) using an area (x) of a signal attributed to four hydrogen atoms bonded to the phenol group in the repeating unit (1) and an are (y) of a signal attributed to two hydrogen atoms respectively bonded to the carbon atom two atoms away from the phenolic hydroxyl group.

$$A=(y\times 100/x)\times 2 \quad (S1)$$

It should be noted that in the spectrum obtained when measured under the following conditions, the signal attributed to the four hydrogen atoms bonded to the phenol group in the repeating unit (1) was observed from 6.5 to 6.95 ppm. In addition, the signal attributed to each of the two hydrogen atoms bonded to the carbon atom two atoms away from the phenolic hydroxyl group was observed from 7.2 to 7.3 ppm.

[Measurement Conditions]

Apparatus: "Varian NMR System PS400WB" manufactured by Varian Inc.

Magnetic field strength: 9.4 T (400 MHz)

Probe: "Varian 400 DB AutoX WB Probe" (5 mm) manufactured by Varian Inc.

Measurement method: single pulse method

Measurement temperature: 50° C.

Measurement solvent: deuterated dimethylsulfoxide (containing TMS)

Latency: 10 seconds

Pulse irradiation time 11.9 μs (90° pulse)

Number of integrations; 64 times

External standard: TMS (0 ppm)

<Production of Aromatic Polysulfone>

Production Example 1

85.46 parts by mass of bis(4-chlorophenyl) sulfone, 75.08 parts by mass of bis(4-hydroxyphenyl) sulfone 43.54 parts by mass of potassium carbonate and 165 parts by mass of N-methyl-2-pyrrolidone (hereinafter sometimes referred to as "NMP") were mixed and reacted at 190° C. for 6 hours in a polymerization vessel equipped with a stirrer, a nitrogen inlet tube, a thermometer, and a condenser attached with a receiver at the tip. Subsequently, the obtained reaction mixture solution was diluted with NMP and cooled to room temperature to precipitate unreacted potassium carbonate and potassium chloride generated as a by-product. By reducing the amount of these inorganic salts by filtration, an aromatic polysulfone solution in which an aromatic polysulfone was dissolved in NMP was obtained. Furthermore, this solution was added dropwise into water to precipitate aromatic polysulfone and unnecessary NMP was reduced by filtration, thereby obtaining a precipitate. The obtained precipitate was repeatedly washed with water and dried by heating at 150° C. to obtain an aromatic polysulfone.

Figure 2:
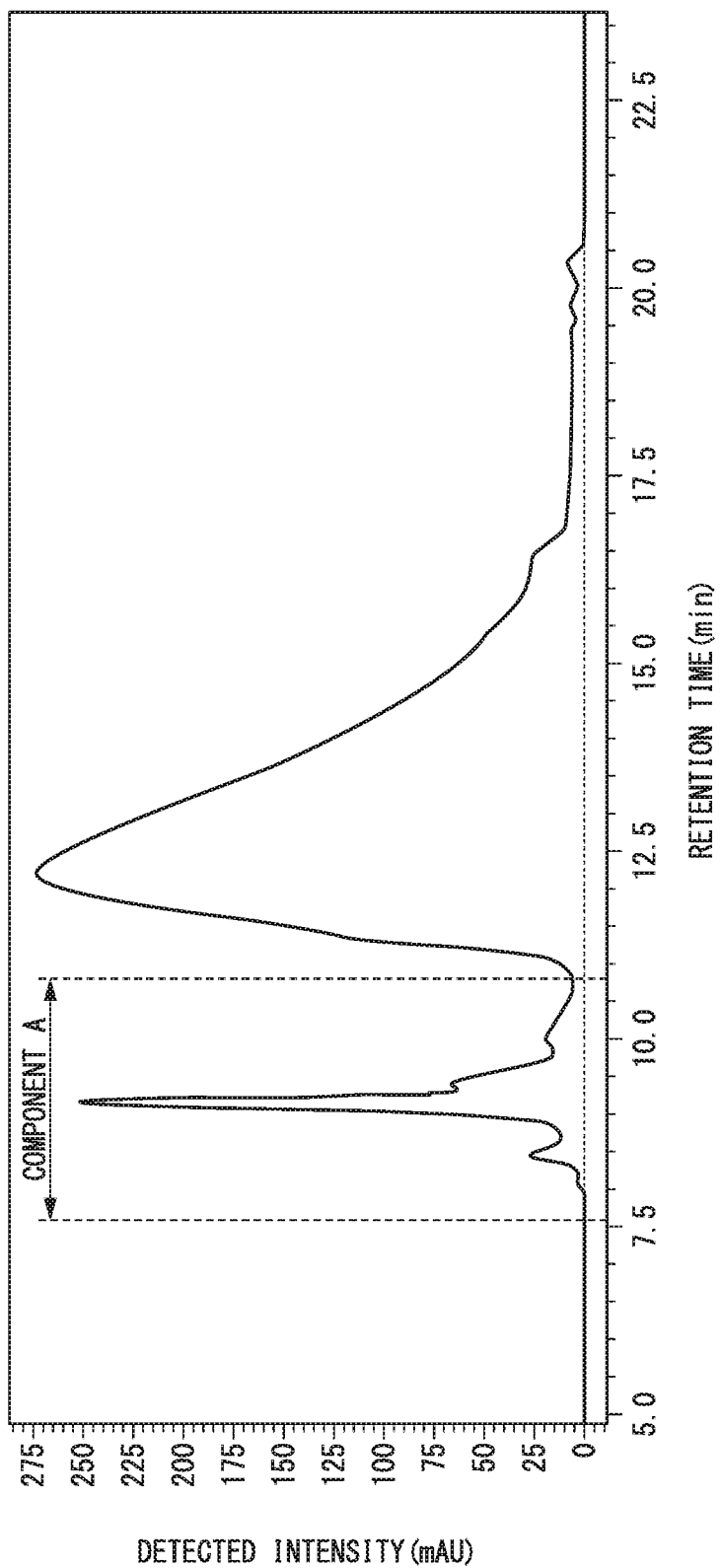
FIG. 2 is a chromatogram of Production Example 1 obtained by a GPC method (content measurement).

In the above content measurement, the obtained chromatogram is shown in FIG. 2. That is, FIG. 2 shows a chromatogram of Production Example 1 obtained by the above content measurement. As a result of fractionation of the aromatic polysulfone having a highly polar functional group (component A) in the chromatogram shown in FIG. 2, followed by analysis by the MALDI method, it was found that the highly polar functional group was sulfonic acid or sulfinic acid.

Example 1

1 part by mass of the aromatic polysulfone obtained in Production Example 1 and about 10 parts by mass of dichloromethane were mixed and shaken at room temperature and then allowed to stand for 1 hour. After standing, the upper layer dissolved in dichloromethane was extracted. After repeating a set of these operations three times in total, the remaining gel-like composition was heated and vacuum-dried at 40° C. to obtain an aromatic polysulfone of Example 1. Here, the term "vacuum" refers to "a state of a space filled with a gas having a pressure lower than normal atmospheric pressure" as described in JIS Z 8126-1: 1999.

Example 2

1 part by mass of the aromatic polysulfone obtained in Production Example 1 and about 10 parts by mass of dichloromethane were mixed and shaken at room temperature and then allowed to stand overnight. After standing, the upper layer dissolved in dichloromethane was extracted. After repeating a set of these operations three times in total, the remaining gel-like composition was heated and vacuum-dried at 40° C. to obtain an aromatic polysulfone of Example 2.

Example 3

100 parts by mass of the aromatic polysulfone of Example 1 and 40 parts by mass of the aromatic polysulfone of Example 2 were mixed to obtain an aromatic polysulfone of Example 3.

Example 4

100 parts by mass of the aromatic polysulfone of Example 3 and 50 parts by mass of the aromatic polysulfone of Production Example 1 were mixed to obtain an aromatic polysulfone of Example 4.

Example 5

120 parts by mass of the aromatic polysulfone of Example 3 and 100 parts by mass of the aromatic polysulfone of Production Example 1 were mixed to obtain an aromatic polysulfone of Example 5.

Comparative Example 1

The aromatic polysulfone of Production Example 1 was used as it was.

Comparative Example 2

1031.7 parts by mass of bis(4-chlorophenyl) sulfone, 901.0 parts by mass of bis(4-hydroxyphenyl) sulfone and 1713.6 parts by mass of diphenylsulfone were mixed in a polymerization vessel equipped with a stirrer, a nitrogen inlet tube, a thermometer, and a condenser attached with a receiver at the tip and the temperature was raised to 180° C. while causing nitrogen gas to flow into the system. After adding 499.5 parts by mass of potassium carbonate to the obtained mixed solution, the temperature was gradually raised to 265° C., and the resulting mixture was further reacted at 265° C. for 10 hours. Subsequently, the obtained reaction mixture solution a, cooled to room temperature to be solidified, finely pulverized, and then washed several times by decantation and filtration using warm water and a mixed solvent of acetone and methanol. The obtained solid was heated and dried at 150° C. to obtain an aromatic polysulfone of Comparative Example 2.

Mw and Mw/Mn values and the number (A) of phenolic hydroxyl groups per 100 repeating units represented by the formula (1) of the aromatic polysulfones of the examples and comparative examples are shown in Table 1.

TABLE 1

| | Number of phenolic hydroxyl groups (groups/100 repeating units) | Mw | Mw/Mn |
|---|---|---|---|
| Example 1 | 2.10 | 43,600 | 1.60 |
| Example 2 | 2.60 | 35,100 | 1.67 |
| Example 3 | 2.48 | 35,100 | 1.72 |
| Example 4 | 2.47 | 34,300 | 1.74 |

TABLE 1-continued

| | Number of phenolic hydroxyl groups (groups/100 repeating units) | Mw | Mw/Mn |
|---|---|---|---|
| Example 5 | 2.42 | 33,700 | 1.75 |
| Comparative Example 1 | 2.44 | 30,700 | 1.86 |
| Comparative Example 2 | 1.64 | 33,000 | 1.97 |

<Evaluation of Adhesive Properties of Aromatic Polysulfone>

15 parts by mass of the aromatic polysulfones of Examples 3 to 5 and Comparative Example 1 and 85 parts by mass of NMP were mixed in a heating vessel and stirred at 60° C. for 2 hours to obtain a pale yellow aromatic polysulfone solution. The resultant was applied to one side of a glass plate having a thickness of 3 mm using a film applicator and then dried at 60° C. using a high temperature hot air dryer to form a coating film of an aromatic polysulfone. This coating film was heat-treated at 250° C. while causing nitrogen to flow, thereby forming an aromatic polysulfone film having a thickness of 30 μm on the glass plate. This film was peeled off from the glass plate to obtain an aromatic polysulfone film.

Subsequently, the aromatic polysulfone film and a double-sided tape ("Tackmate TM-15-20" manufactured by Yamato Co., Ltd.) were adhered. Then, peel strength was measured using Autograph, and adhesive properties of the aromatic polysulfone were evaluated. Conditions for evaluating the adhesive properties using Autograph were as follows.

Tensile speed: 5 mm/min
Temperature: 23° C.
Humidity: 50%

<Evaluation of Solvent Resistance of Aromatic Polysulfone>

The aromatic polysulfones of the examples and comparative examples were hot pressed at 295° C. to prepare an evaluation film having a thickness of 100 μm. Subsequently, the evaluation film was immersed in a container containing tetrahydrofuran for 30 minutes. After immersion, the appearance of the evaluation film was visually observed, and the solvent resistance of the aromatic polysulfone was evaluated. Criteria for the evaluation of solvent resistance were as follows.

A: No change was observed in the evaluation film.
B: White turbidity was observed on the evaluation film.

The results of evaluation of adhesive properties and solvent resistance of the aromatic polysulfones of the examples and comparative examples are shown in Table 2.

TABLE 2

| | Ratio of aromatic polysulfone having highly polar functional group (% by mass) | Peel strength (N/cm$^2$) | Solvent resistance |
|---|---|---|---|
| Example 1 | 39 | — | A |
| Example 2 | 24 | — | A |
| Example 3 | 27 | 9.02 | A |
| Example 4 | 22 | 8.92 | — |
| Example 5 | 20 | 9.19 | B |
| Comparative Example 1 | 12 | 5.69 | B |
| Comparative Example 2 | 17 | — | — |

As shown in Table 2, in the aromatic polysulfones of Examples 3 to 5, since the ratio of the aromatic polysulfone having a highly polar functional group with respect to the combined total of all the aromatic polysulfones (that is, the content ratio of the aromatic polysulfone having a highly polar functional group with respect to the total mass of aromatic polysulfones) was 19% by mass or more, the peel strength was relatively high and the adhesive properties were excellent. It can be said that the same trend also applies for Examples 1 and 2 in which the ratio of the aromatic polysulfone having a highly polar functional group with respect to the combined total of all the aromatic polysulfones was 19% by mass or more.

On the other hand, in the aromatic polysulfone of Comparative Example 1, since the ratio of the aromatic polysulfone having a highly polar functional group with respect to the combined total of all the aromatic polysulfones was less than 19% by mass, the peel strength was relatively loin and the adhesive properties were inferior. It can be said that the same trend also applies for Comparative Example 2 in which the ratio of the aromatic polysulfone having a highly polar functional group with respect to the combined total of all the aromatic polysulfones was less than 19% by mass.

Furthermore, in the aromatic polysulfones of Examples 1 to 3, not only the adhesive properties but also the solvent resistance was excellent, since the ratio of the aromatic polysulfone having a highly polar functional group with respect to the combined total of all the aromatic polysulfones was more than 20% by mass. It can be said that the same trend also applies for Example 4 in which the ratio of the aromatic polysulfone having a highly polar functional group with respect to the combined total of all the aromatic polysulfones was more than 20% by mass.

From the above results, it was confirmed that the present invention useful.

INDUSTRIAL APPLICABILITY

According to the present invention, an aromatic polysulfone excellent in adhesive properties and an aromatic polysulfone composition containing the aromatic polysulfone can be provided, which is industrially useful.

The invention claimed is:

1. An aromatic polysulfone comprising an aromatic polysulfone having at least one highly polar functional group at its terminus,
   wherein the highly polar functional group is a polar functional group having an acid dissociation constant smaller than that of a carboxyl group, and
   wherein in said aromatic polysulfone, an area of a signal attributed to said aromatic polysulfone having a highly polar functional group with respect to a total area of all signals attributed to said aromatic polysulfone is 19% or more and 100% or less in a chromatogram obtained through a gel permeation chromatography method.

2. The aromatic polysulfone according to claim 1, wherein the area of the signal attributed to said aromatic polysulfone having a highly polar functional group is more than 20% and 100% or less with respect to the total area of all signals attributed to said aromatic polysulfone.

3. The aromatic polysulfone according to claim 1, which comprises a repeating unit represented by a formula (1), $$\beta\text{-Ph}^1\text{-SO}_2\text{-Ph}^2\text{-O}— \quad (1)$$

wherein $Ph^1$ and $Ph^2$ each independently represent a phenylene group, and at least one hydrogen atom in said phenylene group may be each independently substituted with an alkyl group, an aryl group or a halogen atom.

4. The aromatic polysulfone according to claim 3, which comprises 0.5 to 10 phenolic hydroxyl groups per 100 repeating units represented by said formula (1).

5. An aromatic polysulfone composition comprising the aromatic polysulfone according to claim 1.

6. The aromatic polysulfone composition according to claim 5, further comprising a filler.

* * * * *